US005938728A

United States Patent [19]
Dwork et al.

[11] Patent Number: 5,938,728
[45] Date of Patent: Aug. 17, 1999

[54] APPARATUS AND METHOD FOR SELECTIVELY CONTROLLING CLOCKING AND RESETTING OF A NETWORK INTERFACE

[75] Inventors: Jeffrey Roy Dwork, San Jose; Ching Yu, Santa Clara; Robert Alan Williams, Cupertino; Rajat Roy, Sunnyvale, all of Calif.

[73] Assignee: Advanced Micro Devices, Inc., Sunnyvale

[21] Appl. No.: 08/961,190

[22] Filed: Oct. 30, 1997

[51] Int. Cl.[6] ...................................................... G06F 13/12
[52] U.S. Cl. .............................................................. 709/222
[58] Field of Search ....................... 364/DIG. 1 MS File, 364/DIG. 2 MS File; 709/200, 218, 220, 221, 222–250, 253; 714/4, 24; 710/104; 713/500, 501, 600, 601, 100, 300, 323, 1, 2; 395/712

[56] References Cited

U.S. PATENT DOCUMENTS 5,708,820  1/1998  Park et al. .................................. 714/24
5,809,223  9/1998  Lee et al. ..................................... 714/4

Primary Examiner—Robert B. Harrell

[57] ABSTRACT

A network interface for a workstation, configured to be powered down to a standby mode while the network interface remains in a powered-up condition, includes a bypass circuit configured to enable configuration registers in the network interface to complete loading of configuration information in a known state, regardless of an absence of an external data clock from the network during the initialization interval. The bypass circuit ensures that the configuration registers in the network interface that require a network clock (e.g., a transmit clock or a receive clock) are maintained in a known state to enable the network interface to be independently initialized. One example of the bypass circuit holds a power on reset signal until the necessary network clock signal is detected for a predetermined number of detected clock cycles. Another example of the bypass circuit substitutes the absent clock signal with an independent clock source in response to the power on reset signal and holds the power on reset signal for a predetermined number of independent clock cycles, followed by switching back to the signal path providing the required clock signal. The disclosed arrangement enables the network interface device to initialize upon power up and start to monitor network media for wakeup traffic indicating the host computer in the workstation should be activated.

19 Claims, 5 Drawing Sheets

APPARATUS AND METHOD FOR SELECTIVELY CONTROLLING CLOCKING AND RESETTING OF A NETWORK INTERFACE

BACKGROUND OF THE INVENTION

1. Technical Field

The present invention relates to power and clock supply management in a network workstation, more specifically to arrangements for initializing a network interface using clock sources from different power supply domains.

2. Description of the Related Art

Workstation computers are currently being designed to have multiple power supply domains, where a network interface within the workstation will remain in an operative state even though the host computer powers down into a standby state, for example, after a prescribed interval of inactivity. In such a case, internal logic within the workstation separates the externally supplied power into different power supply domains, for example a constant-supply domain that supplies power to selected components at all times that the workstation receives the externally supplied power, and a main power supply which powers the rest of the computer system in response to prescribed power supply conditions, for example a user pressing a power supply button, or reception by the network interface of a power management packet from a remote workstation.

Thus, the workstation may have a state where the network interface to a packet switched network may be operable based on a constant power supply, whereas the host computer (e.g., CPU) is in a standby mode, such that communication between the host computer and the network interface via a system bus is non-existent.

Network interfaces may typically be loaded at initialization with configuration information stored in a nonvolatile memory in response to a supplied clock, for example a PCI clock from the host computer or a network clock from the network. Conventional arrangements assume that the network interface during initialization has a state where both the host computer and the network are operable to enable configuration of the network interface. However, the segmenting of the network interface into a power supply domain that is separate from the respective power supply domains of the host computer and/or the network may cause a situation where the network interface enters an unknown state, since the network interface configuration registers are configured for loading configuration data in a prescribed sequence using a network transmit data clock or a network receive data clock. Hence, absence of either network interface clock when required may result in the network interface being inoperable without an entire system-wide reset of the workstation and the network in order to reinitialize the network interface according to the necessary sequence.

One common technique for resetting a system is to use asynchronous resets on the flip flops of internal configuration registers. However, use of asynchronous resets causes the problem that virtually all flip flops of this design need to be reset, resulting in a complete reload of the configuration registers. Moreover, the necessity of asynchronous resets results in a larger flip flop requiring more area on silicon.

SUMMARY OF THE INVENTION

There is a need for an arrangement that enables a network interface in a workstation to be initialized without requiring powering up of the host workstation or the associated network to provide a clock to drive the network interface configuration registers.

There is also a need for an arrangement that enables a network interface to be initialized, where the network interface is placed in a known state pending reception of a clock from an external source.

There is also a need for an arrangement that enables a network interface to be initialized independent of the presence of an externally-supplied clock necessary for operation of the network interface.

These and other needs are attained by the present invention, where a bypass circuit is configured for enabling configuration registers in a network interface to complete loading of configuration information in a known state, regardless of an absence of an external data clock during the initialization interval.

According to one aspect of the present invention, an apparatus is configured for initializing a network interface configured for receiving a network clock from a network. The apparatus comprises a reset detection circuit configured for generating a reset signal for the network interface in response to detecting a power-on condition where the reset detection circuit outputs the reset signal until reception of a network clock detection signal. The apparatus also comprises a network clock detecting circuit configured for generating the network clock detection signal a predetermined interval after detection of the network clock, wherein the network interface is configured for loading the initializing information from a nonvolatile memory in response to the reset signal and the network clock. The reset detection circuit ensures that the reset signal is maintained for the network interface until a predetermined interval after detection of the network clock, ensuring the network interface is maintained in a known reset state until the network clock is available to complete initialization of the network interface. In addition, the reset detection circuit maintains the reset signal until after a predetermined interval, such that intermittent network clock signals during initial power up of the network do not adversely affect the network interface, resulting in a more robust initialization routine.

Another aspect of the present invention provides an apparatus for initializing a network interface configured for receiving a network clock from a network, the apparatus comprising a clock source independent from a power condition of the network and outputting an independent clock signal, and a clock bypass circuit configured for selectively supplying one of the independent clock signal and the network clock to the network interface, the clock bypass circuit supplying the independent clock signal for a predetermined interval in response to a power on reset signal, wherein the network interface is configured for loading initializing information in response to the reset signal and the supplied clock signal. The clock bypass circuit enables the network interface to be initialized, independent of the power condition of the network supplying the network clock. Hence, the network interface can be configured to automatically start the host computer without any prior coordinated initialization between the host computer and the network.

Still another aspect of the present invention provides a network interface for sending and receiving data between a host computer and a network the network interface comprising a first set of registers configured for loading first configuration information from a nonvolatile memory in response to a power on reset signal and a network data clock, a second set of registers configured for storing second configuration information from the nonvolatile memory in response to a clock source signal independent from the network, and a bypass circuit configured for enabling the first set of registers to complete loading of the first configuration information, regardless of an absence of the network data clock. The bypass circuit controls the state of the first set of registers to ensure that loading of the corresponding first configuration information can be completed, regardless of whether the required data clock is absent at any time during the initialization procedure. One particular aspect of the bypass circuit holds the first set of registers in a predetermined state (e.g., reset) until the required clock is available. Another aspect of the bypass circuit selectively supplies an independent clock source signal for a predetermined interval in response to a power on reset signal to enable the first set of registers to load the necessary configuration information in the absence of the required clock signal.

Yet another additional aspect of the present invention provides a method of loading configuration information in a network interface configured for receiving a network data clock, comprising detecting a power on reset signal from a host computer system, and selectively holding the power on reset signal for a prescribed interval to enable network interface registers, configured for loading the configuration information in response to the reset signal and a network data clock, to complete loading of the configuration information regardless of an absence of the network data clock. The selective holding of the power on reset signal maintains the network interface registers in known initialization states in the event that the one required data clock is unavailable during at least a portion of the configuration procedure. In one example of the selectively holding step, the power on reset signal is selectively held for a prescribed interval relative to an independent clock to enable the network interface register to complete loading of the configuration information in response to the power on reset signal and the independent clock. In another example of the selectively holding step, the power on reset signal is sampled and held until a predetermined number of clock cycles have been detected from the required one data clock.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

The present invention will be described with the example of a network interface in a packet switched network, such as an Ethernet (IEEE 802.3) network. A description will first be given of a network interface architecture, followed by the arrangement for initializing the network interface using a bypass circuit that enables configuration registers to complete loading of configuration information, regardless of an absence of a required clock. It will become apparent, however, that the present invention is also applicable to other network interface systems.

NETWORK INTERFACE ARCHITECTURE

Figure 1:
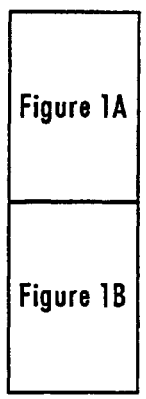
FIGS. 1, 1A and 1B are block diagrams illustrating an exemplary network interface which may be used for initialization independent from a network data clock according to an embodiment of the present invention.
Figure 1A:
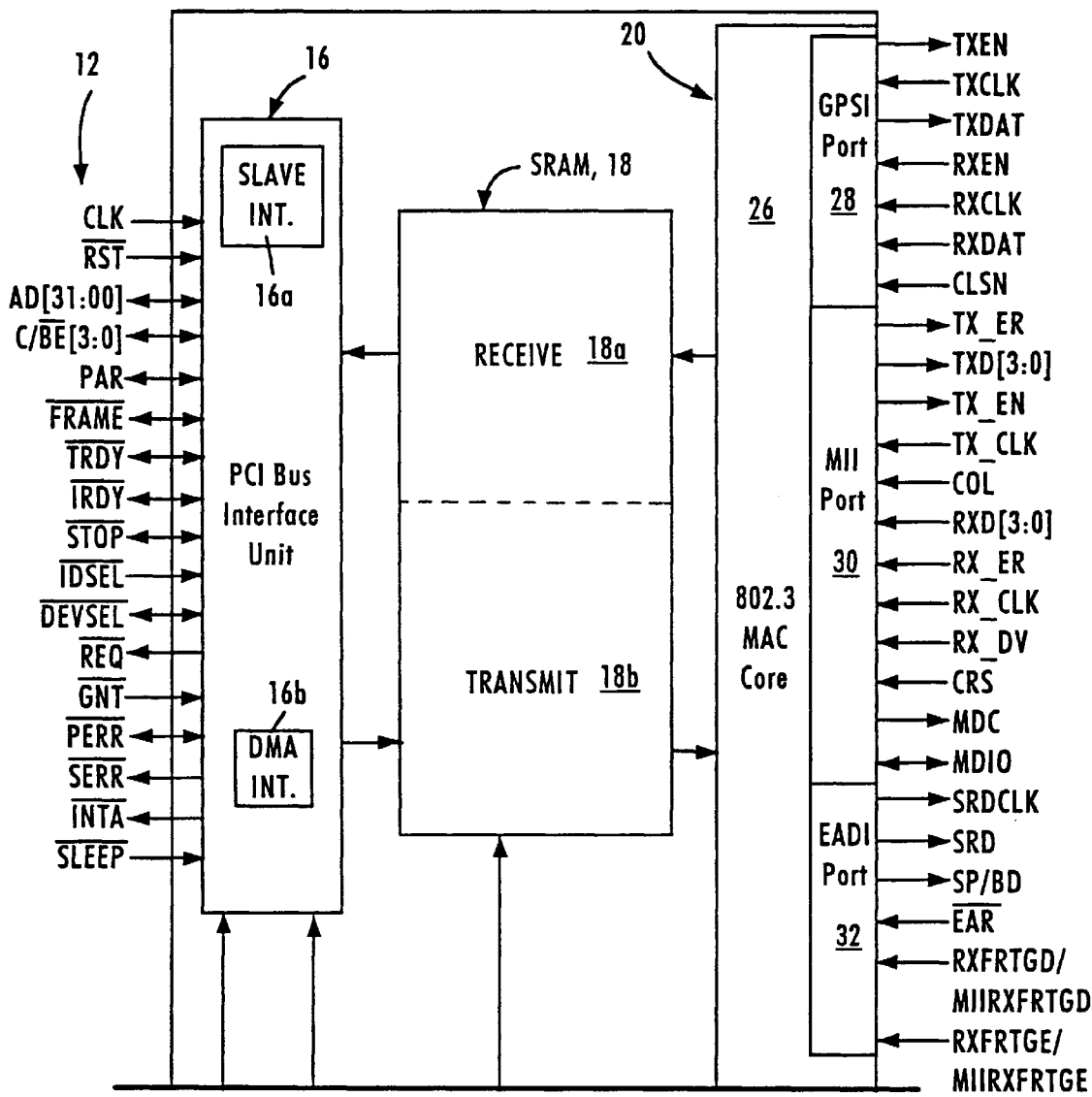
Figure 1B:
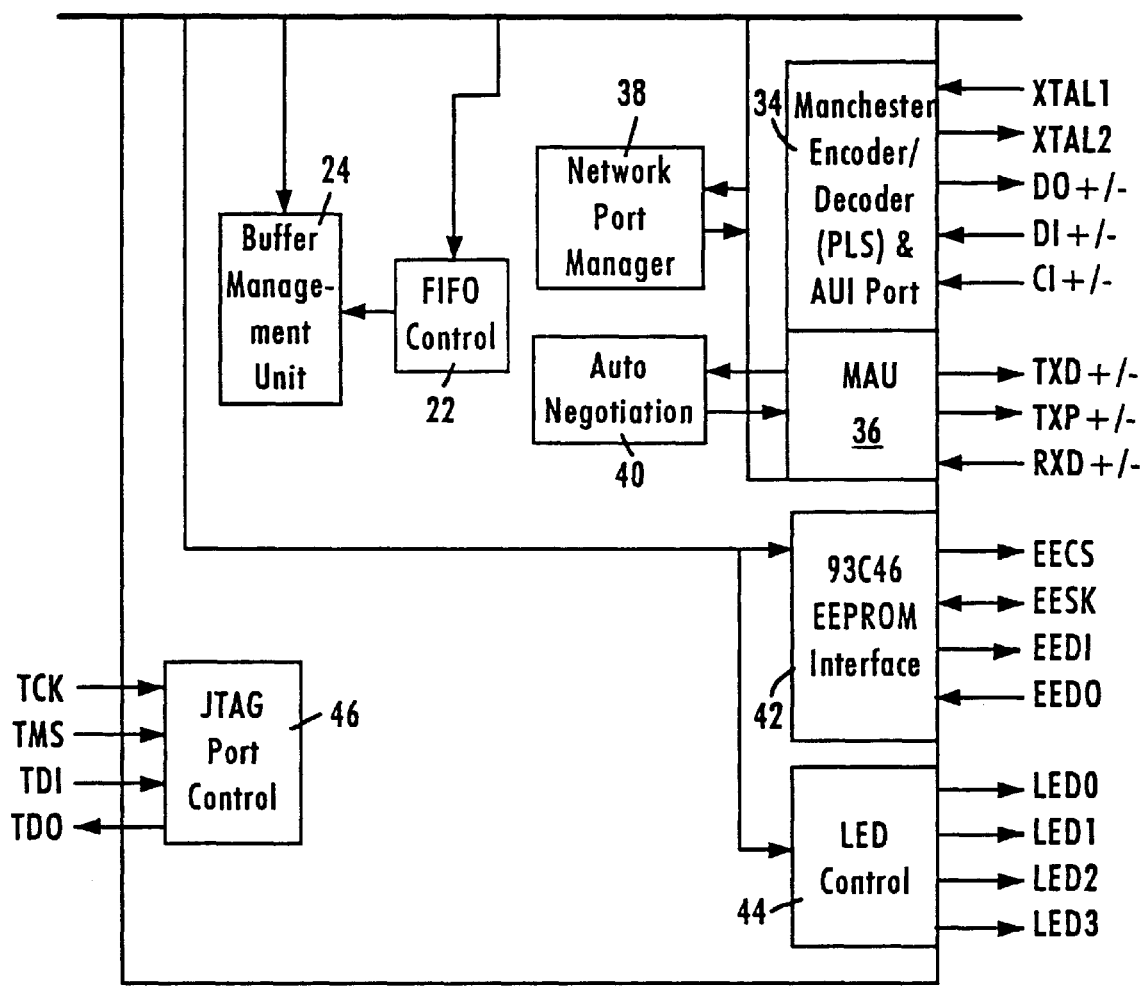

FIG. 1 is a block diagram of an exemplary network interface 10 that accesses the media of an Ethernet (ANSI/IEEE 802.3) network according to an embodiment of the present invention.

The network interface 10, preferably a single-chip, 32-bit Ethernet controller, provides an interface between a local bus 12 of a computer, for example a peripheral component interconnect (PCI) local bus, and an Ethernetbased media 50.

The interface 10 includes a PCI bus interface unit 16, a buffer memory portion 18, and a network interface portion 20. The PCI bus interface unit 16 includes a PCI slave interface 16a and a DMA interface 16b. The slave interface 16a manages PCI control and status information including reading and programming of the PCI status registers, but may also be configured for managing slave transfers via the PCI bus with a host CPU. The DMA interface 16b manages DMA transfers by the network interface 10 to and from system memory. Hence, the PCI bus interface unit 16 can be selectively configured for PCI transfers in slave and/or master (e.g., DMA) mode.

The memory portion 18 includes a 16-bit SRAM implemented directly on the network interface chip 10. According to the disclosed embodiment, the SRAM 18 may be accessed in a random access manner under the control of a first in, first out (FIFO) control unit 22, or may be segmented into a receive portion 18a and a transmit portion 18b for receive and transmit paths, respectively.

The network interface 10 also includes a buffer management unit 24 configured for managing DMA transfers via the DMA interface 16b. The buffer management unit 24 manages DMA transfers based on DMA descriptors in host memory that specify start address, length, etc. The buffer management unit 24 initiates a DMA read from system memory into the transmit buffer 18b by issuing an instruction to the DMA interface 16b, which translates the instructions into PCI bus cycles. Hence, the buffer management unit 24 contains descriptor management for DMA transfers, as well as pointers associated with storing and reading data from the memory portion 18. Although the buffer management unit 24 and the memory controller 22 are shown as discrete components, the two units may be integrated to form a memory management unit controlling all transfers of data to and from the memory unit 18.

The network interface 20 includes a media access control (MAC) core 26, a general purpose serial interface (GPSI) 28, a media independent interface (MII) 30 for connecting to external 10 Mb/s or 100 Mb/s physical (PHY) transceivers, an external address detection interface (EADI) 32, an attachment unit interface (AUI) 34 having a Manchester encoder and decoder, and a 10/100 Mb/s twisted pair transceiver media attachment unit (MAU) 36.

The network interface 10 also includes a network port manager 38 configured for performing MII handshaking between two devices on an MII bus via the MII port 30. Such MII handshaking may include link information, programming information at the MII layer using a management data clock (MDC), and management data input/output (MDIO) paths.

The auto-negotiation portion 40 performs IEEE-compliant negotiation with a link partner on the PHY layer to exchange data indicating whether the link partner is capable of operating at 10 Mb/s, 100 Mb/s, and whether the link should be half-duplex or full-duplex.

The LED controller 44 selectively controls the generation of LED output signals based upon the internal decoding logic and network interface status registers (not shown). The network interface 10 also includes an IEEE 1149.1-compliant JTAG boundary scan test access port interface 36.

The EEPROM interface 42 connects to an EEPROM on either a network interface adapter card or the motherboard of the host computer via a serial interface link. The EEPROM (not shown in FIG. 1)) will be programmed with configuration information related to the network interface, enabling the network interface to be configured during initialization via the EEPROM interface 42. Once initialized, the network interface stores the configuration information in internal registers (not shown), enabling the network interface to operate independently of the host computer in the event the host computer is powered down. Hence, the network interface can be configured to operate while the host computer is in a stand-by mode, enabling the network interface to output power up information to logic within the host computer to enable the host computer to automatically turn on in response to data packets received from the network and having a specific protocol, described below.

INDEPENDENT INITIALIZATION OF A NETWORK INTERFACE

Figure 2:
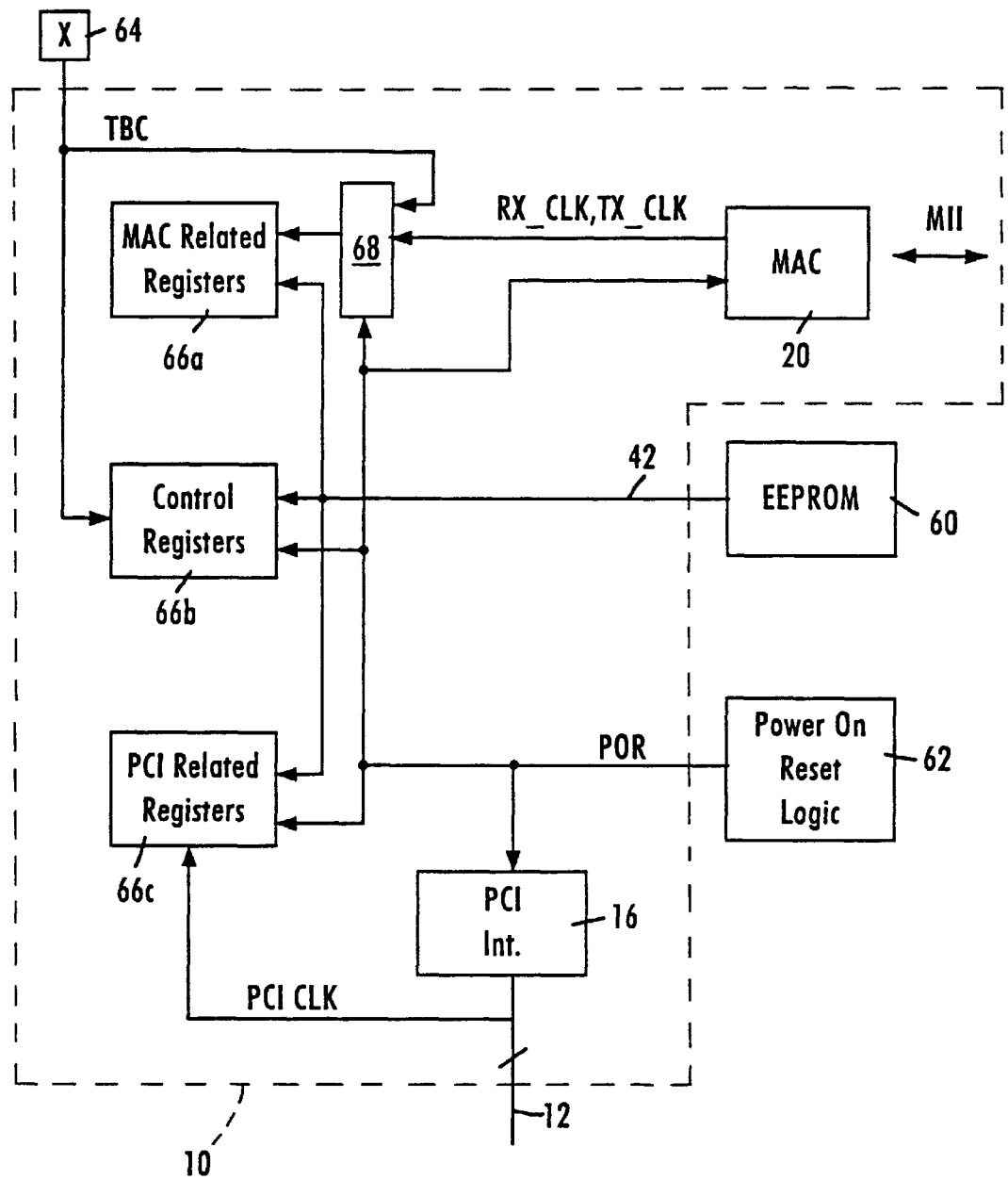
FIG. 2 is a block diagram illustrating network interface configuration registers responsive to different clock sources of respective power supply domains according to an embodiment of the present invention.

FIG. 2 is a block diagram of the network interface illustrating network interface configuration registers according to an embodiment of the present invention. As shown in FIG. 2, the network interface 10 receives configuration information from a serial EEPROM 60 configured for supplying configuration information to the network interface 10 via the EEPROM interface 42. According to the disclosed embodiment, both the external EEPROM 60 and the network interface 10 are powered by a constant power supply that supplies power upon reception of power from an external source, for example upon plugging the workstation into a 120 volt AC power supply. Upon detecting a 120 volt power supply, a power on reset signal (POR) is output by power on reset logic 62, which may be located within the workstation on the motherboard or on a separate power supply board.

According to the disclosed embodiment, a network interface device 10 must initialize upon power up and start to monitor the network media 50 for wake up traffic, regardless of the speed of the PCI bus 12 and network clocks (e.g. TX_CLK and RX_CLK from the MII interface) on the network media 50. According to the disclosed embodiment, initialization data is read from the EEPROM 60 using an internally generated or externally provided continuously running clock source 64 that outputs a 20 MHz (nominal) clock signal independent of the power supply domain of the host computer or the network. Hence, the network interface 10 can use the independent clock from the independent clock source 64 to selectively load configuration registers to begin monitoring for network wakeup traffic. The independent clock source 64 may be driven by the same constant power supply as the network interface 10, or alternately by a separate power source, for example a battery.

The network interface 10 includes configuration registers 66 for storing configuration information from the EEPROM 60 in response to the power on reset signal from the power on reset logic 62 and respective clock signals. Specifically, the network interface 10 includes MAC related configuration registers 66 configured for storing and outputting data in response to a MAC-based clock signal, for example the receive clock (RX_CLK) or the transmit clock (TX_CLK) from the MII port 30 of the MAC 20. The MAC-related registers 66a may be configured to respond to the network clocks, for example for synchronization purposes relative to the data transmitted to and from the network media 50. ////

A second set of control registers 66c are synchronized to the PCI clock from the PCI bus 12 to store control, configuration and status information related to operations of the PCI bus interface unit 16. A third set of control registers 66b are configured to store control and configuration information that does not need to be synchronized to either the network clocks or the PCI bus clock, and hence are coupled to the independent clock signal from the independent clock source 64.

The EEPROM 60 will only load information into the MAC control registers 66a and the PCI control registers 66c if the respective clocks are running. The PCI bus 12, however, generates a reset upon wake up of the host system, during which point the bus related registers 66c will be loaded by the EEPROM. As described above, the MAC-related registers 66a are responsive to one of the network clocks (e.g., TX_CLK, RX_CLK) that may be absent if the PHY transceiver associated with the MAC 20 or a destination PHY transceiver are inoperable, such that there is no detected network clock. In such a case, the MAC-related registers 66a conventionally would not have an available clock to perform wakeup operations until the network was active, possibly affecting the initial state of network interface 10. Hence, an additional reset would be necessary in the workstation network interface 10, and network to resynchronize the systems to known states.

According to the disclosed embodiment, the network interface 10 includes bypass circuitry 68 configured for enabling the MAC-related registers 66a to complete loading of configuration information from the EEPROM 60, regardless of an absence of a network data clock. As described in detail below, the bypass circuit 68 enables the MAC-related registers 66a to complete loading of configuration information despite the loss of a clock signal. In a first embodiment, the bypass circuit 68 holds the power on reset signal until the absent clock signal is detected for a predetermined minimum number of detected clock cycles. In a second embodiment, the bypass circuit 48 substitutes the absent clock signal with the independent clock source for a specific number of independent ///// clock cycles following detection of the reset signal, followed by switching back to the signal path providing the required clock signal.

Figure 3A:
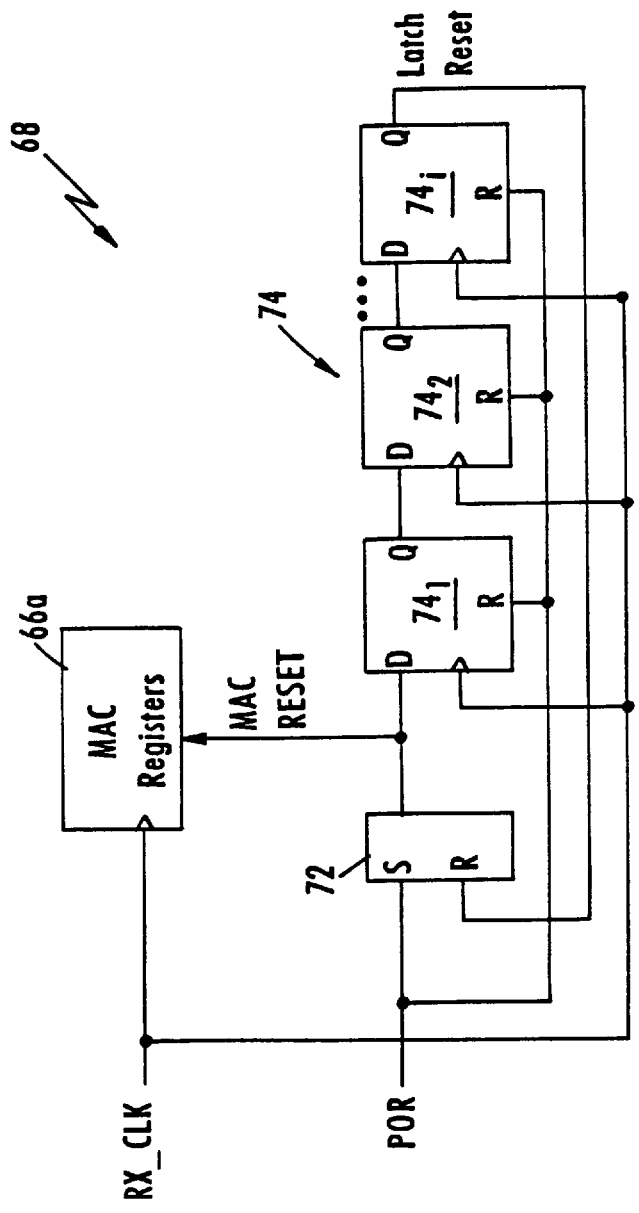
FIGS. 3A and 3B are block and timing diagrams describing the bypass circuit of FIG. 2 according to a first embodiment of the present invention.
Figure 3B:
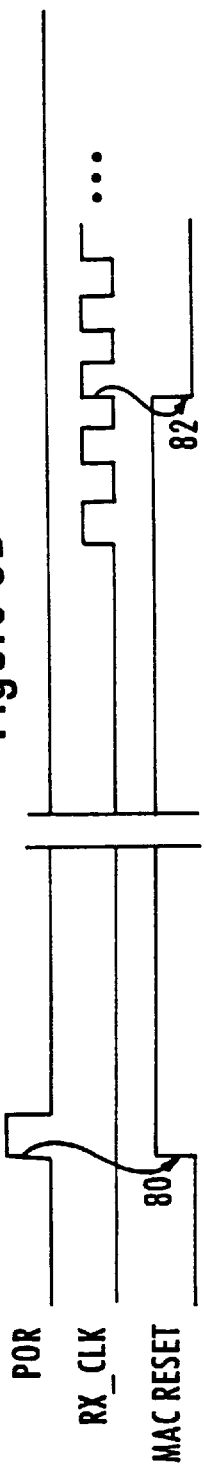

FIGS. 3A and 3B are block and timing diagrams illustrating the arrangement of holding the power on reset signal for a prescribed interval until detection of the required clock signal according to a first embodiment of the present invention.

The power on reset circuit 68 of FIG. 3A includes a reset detection circuit 72 configured for generating a MAC reset signal for the MAC-related registers 66a in response to detecting the power on reset (POR) signal indicating a power-on condition. The reset detection circuit 72 is configured as an SR flip flop that asynchronously latches the power on reset signal at state 80 of FIG. 3B. The bypass circuit 68 also includes a network clock detecting circuit 74 configured for generating a network clock detection signal as a latch reset signal to the R input of the SR flip flop 72 after a predetermined number of network clock signals. The network clock detection circuit 74 includes a plurality of delay flip flops $74_i$ that are reset in response to assertion of the power on reset signal.

The MAC reset signal output by the SR flip flop 72 is supplied as an input to the first delay flip flop $74_i$. Each of the delay flip flops $74_i$ also receives a network clock signal (e.g., RX_CLK) from the media access controller 20 for latching the associated input. As recognized in the art, the network clock will be provided from the external physical layer transceiver (PHY), for example across the MII interface, only when the network is powered up and running. Hence, the power on reset signal is latched by the SR flip flop 72 and held in an asserted state 80, shown in FIG. 3B, until detection of a predetermined number of cycles of the receive clock (RX_CLK) at state 82. Hence, the reset detection circuit 72 asserts the MAC reset signal to maintain the MAC-related registers 66a in a known reset state until a predetermined number of the network clock cycles have been detected to ensure that the MAC interface registers 66a are reset, after which the MAC reset signal is cleared in the SR flip flop 72.

Figure 4A:
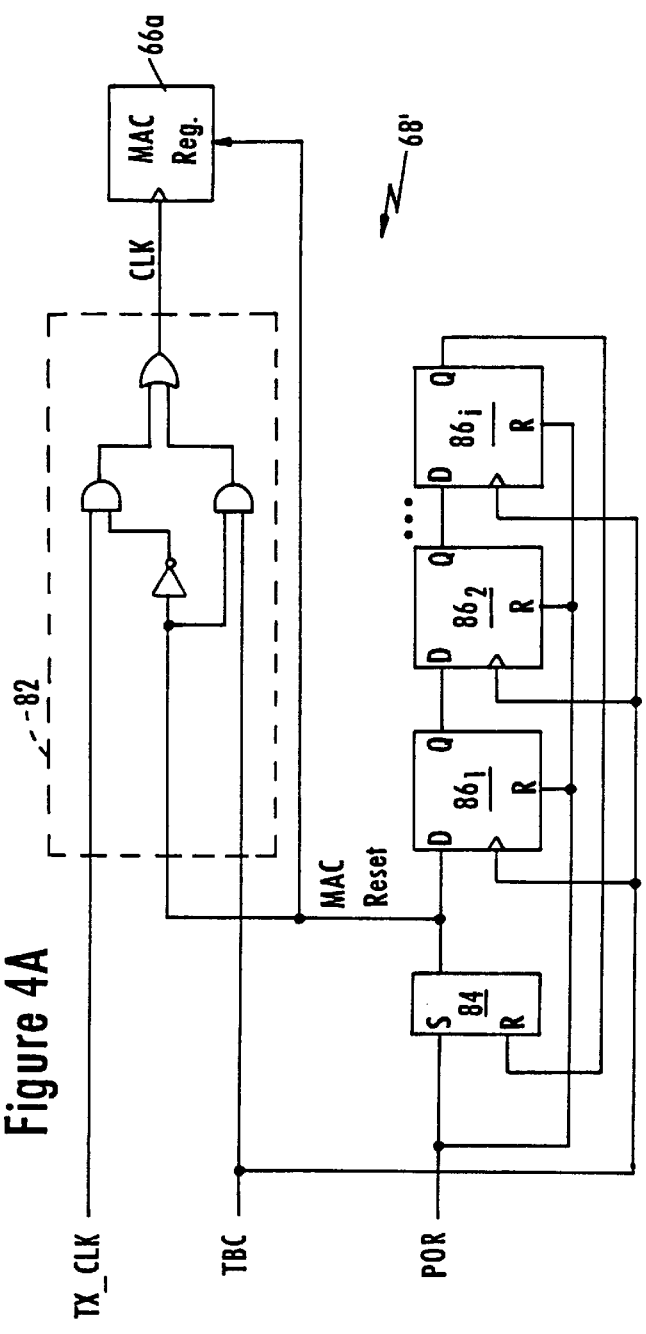
FIGS. 4A and 4B are block and timing diagrams describing the bypass circuit of FIG. 2 according to a second embodiment of the present invention.
Figure 4B:
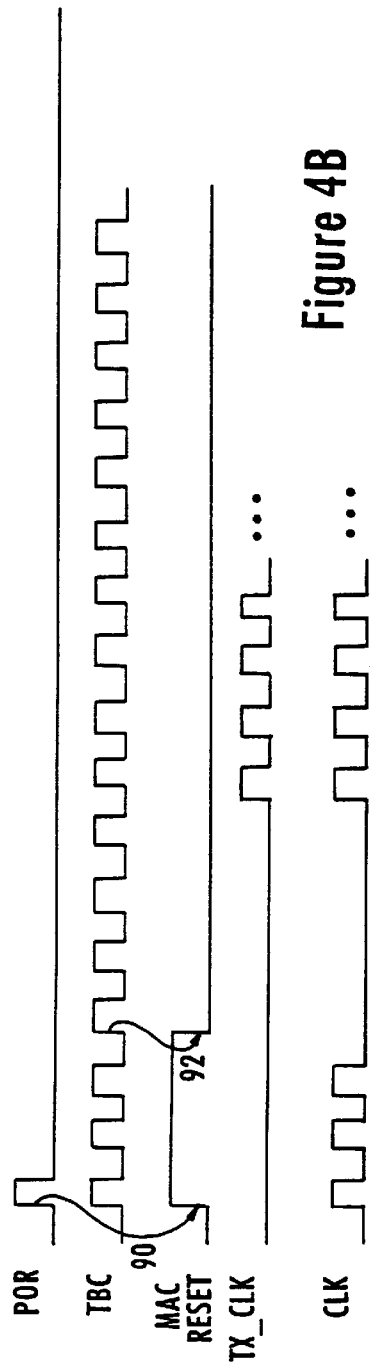

FIGS. 4A and 4B illustrate an alternative arrangement for enabling the MAC-related registers 66a to complete loading of the configuration information from the EEPROM 60 despite an absence of a clock. As shown in FIG. 4A, the bypass circuit 68' includes a reset holding circuit 80 configured for holding the power on reset signal at an asserted level for a predetermined interval, and a selector circuit 82 for selectively supplying either the independent clock signal or the transmit clock signal to the network interface (e.g., the MAC-related registers 66a). Specifically, the reset holding circuit 80 includes an asynchronous SR flip flop 84 for latching the power on reset (POR) signal, similar to the SR flip flop 72 of FIG. 3A. The reset holding circuit 80 also includes a plurality of delay flip flops $86_i$ for successively storing the stored power on reset signal from the SR flip flop 84 in response to the independent clock signal from the independent clock source 64. Each of the delay flip flops 86 also are reset in response to the power on reset signal.

As shown in FIGS. 4A and 4B, the SR flip flop 84 outputs the MAC reset signal in response to detection of the power on reset signal at event 90. The SR flip flop 84 continues to assert the MAC reset signal until a predetermined number of independent clock cycles corresponding to the number of delay flip flops $86_i$ at event 92. Hence, the MAC reset signal is asserted for a predetermined number of independent clock cycles, during which time the selector 82 selects the independent time based clock signal (TBC) as the supplied clock signal to the MAC-related registers 66a. Hence, the MAC-related registers are loaded with configuration information from the EEPROM 60 using an independent clock source. Following the reset state, the selector 82 switches back and connects the clock signal path carrying the transmit clock (TX_CLK) from the MII port 30 to the MAC-related register 66a, such that the clock signal (CLK) supplied to the MAC-related register 66 combines both the independent clock signal and the available transmit clock. Hence, the bypass circuit 68' of FIG. 4A enables the MAC-related registers 66a to be loaded despite the initial absence of the transmit clock signal, followed by connection to the transmit clock signal path to enable synchronization between the MAC-related registers 66a and the network media.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for initializing a network interface configured for receiving a network clock from a network, the apparatus comprising:
    a reset detection circuit configured for generating a reset signal for the network interface in response to detecting a power-on condition, the reset detection circuit outputting the reset signal until reception of a network clock detection signal; and
    a network clock detecting circuit configured for generating the network clock detection signal a predetermined interval after detection of the network clock;
    wherein the network interface is configured for loading the initializing information from a nonvolatile memory in response to the reset signal and the network clock.

2. The apparatus of claim 1, wherein the network clock detecting circuit comprises at least one delay flip flop configured for storing the reset signal in response to the network clock, the delay flip flop outputting the network clock detection signal upon storing the reset signal.

3. The apparatus of claim 2, wherein the network clock detecting circuit comprises a plurality of said delay flip flops configured for successively storing the reset signal in response to the network clock, wherein a selected one of the delay flip flops output the corresponding network clock detection signal, upon the corresponding successive storing of the reset signal, to the reset detection circuit.

4. An apparatus for initializing a network interface configured for receiving a network clock from a network, the apparatus comprising:
    a clock source independent from a power condition of the network and outputting an independent clock signal; and
    a clock bypass circuit configured for selectively supplying one of the independent clock signal and the network clock to the network interface, the clock bypass circuit supplying the independent clock signal for a predetermined interval in response to a power on reset signal, wherein the network interface is configured for loading initializing information in response to the reset signal and the supplied clock signal.

5. The apparatus of claim 4, wherein the clock bypass circuit comprises:
    a reset holding circuit for holding the power on reset signal at an asserted level for the predetermined interval; and
    a selector for supplying the independent clock signal to the network interface in response to the power on reset signal at the asserted level for the predetermined interval.

6. The apparatus of claim 5, wherein the reset holding circuit comprises:
    an asynchronous flip flop configured for storing the power on reset signal in response to detection thereof; and
    a plurality of delay flip flops for successively storing the stored power on reset signal from the asynchronous flip flop in response to the independent clock signal, wherein a selected one of the delay flip flops outputs a latch reset signal to the asynchronous flip flop in response to storing the power on reset signal.

7. The apparatus of claim 6, wherein the asynchronous flip flop clears the stored power on reset signal in response to the latch reset signal.

8. A network interface for sending and receiving data between a host computer and a network, the network interface comprising:
- a first set of registers configured for loading first configuration information from a nonvolatile memory in response to a power on reset signal and a network data clock;
- a second set of registers configured for storing second configuration information from the nonvolatile memory in response to a clock source signal independent from the network; and
- a bypass circuit configured for enabling the first set of registers to complete loading of the first configuration information, regardless of an absence of the network data clock.

9. The network interface of claim 8, wherein the bypass circuit comprises:
- a reset detection circuit configured for holding the power on reset signal for the first set of registers, the reset detection circuit outputting the power on reset signal until reception of a network clock detection signal; and
- a network clock detecting circuit configured for generating the network clock detection signal a predetermined interval after detection of the network data clock, the first set of registers loading the first configuration information during the coincident assertion of the power on reset output by the reset detection circuit and the network data clock.

10. The network interface of claim 9, wherein the network clock detecting circuit comprises a plurality of delay flip flops configured for successively storing the power on reset signal in response to the network data clock, wherein a selected one of the delay flip flops output the corresponding network clock detection signal, upon the corresponding successive storing of the reset signal, to the reset detection circuit.

11. The network interface of claim 10, wherein the predetermined interval is based on the selected one delay flip flop storing the reset signal after a corresponding number of detected network data clock cycles.

12. The network interface of claim 11, wherein at least a portion of the detected network data clock cycles are received by the network interface following the absence of the network data clock.

13. The network interface of claim 8, wherein the bypass circuit supplies the independent clock source signal to the first set of registers for a predetermined interval in response to the power on reset signal.

14. The network interface of claim 13, wherein the bypass circuit comprises:
- a reset holding circuit for holding the power on reset signal at an asserted level for the predetermined interval; and
- a selector for supplying the independent clock signal to the network interface in response to the power on reset signal at the asserted level for the predetermined interval.

15. The network interface of claim 14, wherein the reset holding circuit comprises:
- an asynchronous flip flop configured for storing the power on reset signal in response to detection thereof; and
- a plurality of delay flip flops for successively storing the stored power on reset signal from the asynchronous flip flop in response to the independent clock signal, wherein a selected one of the delay flip flops corresponding to the predetermined interval outputs a latch reset signal to the asynchronous flip flop in response to storing the power on reset signal.

16. A method of loading configuration information in a network interface configured for receiving a network data clock, comprising:
- detecting a power on reset signal from a host computer system; and
- selectively holding the power on reset signal for a prescribed interval to enable network interface registers, configured for loading the configuration information in response to the reset signal and a network data clock, to complete loading of the configuration information regardless of an absence of the network data clock.

17. The method of claim 16, wherein the selectively holding step comprises:
- detecting a predetermined number of clock cycles of the network data clock; and
- asserting the detected power on reset signal until the detection of the predetermined number of cycles.

18. The method of claim 17, wherein the step of detecting the predetermined number of clock cycles comprises detecting at least one clock cycle following the absence of the network data clock.

19. The method of claim 16, wherein the selectively holding step comprises:
- generating a clock signal independent from the network data clock;
- connecting the independent clock signal and supplying the power on reset signal to network interface registers in response to the power on reset signal for a predetermined number of clock cycles of the independent clock signal; and
- connecting a clock signal path, configured for carrying the network data clock, to the network interface registers following the predetermined number of clock cycles.

* * * * *

UNITED STATES PATENT AND TRADEMARK OFFICE
CERTIFICATE OF CORRECTION

PATENT NO. : 5,938,728
DATED : August 17, 1999
INVENTOR(S) : Jeffrey Roy Dwork, et al.

It is certified that error appears in the above-identified patent and that said Letters Patent is hereby corrected as shown below:

In the Claims, in Claim 3, line 1, "claim 2" should read --claim 1--.

Signed and Sealed this

Eighth Day of February, 2000

Attest:

Attesting Officer

Q. TODD DICKINSON

Commissioner of Patents and Trademarks